UNITED STATES PATENT OFFICE.

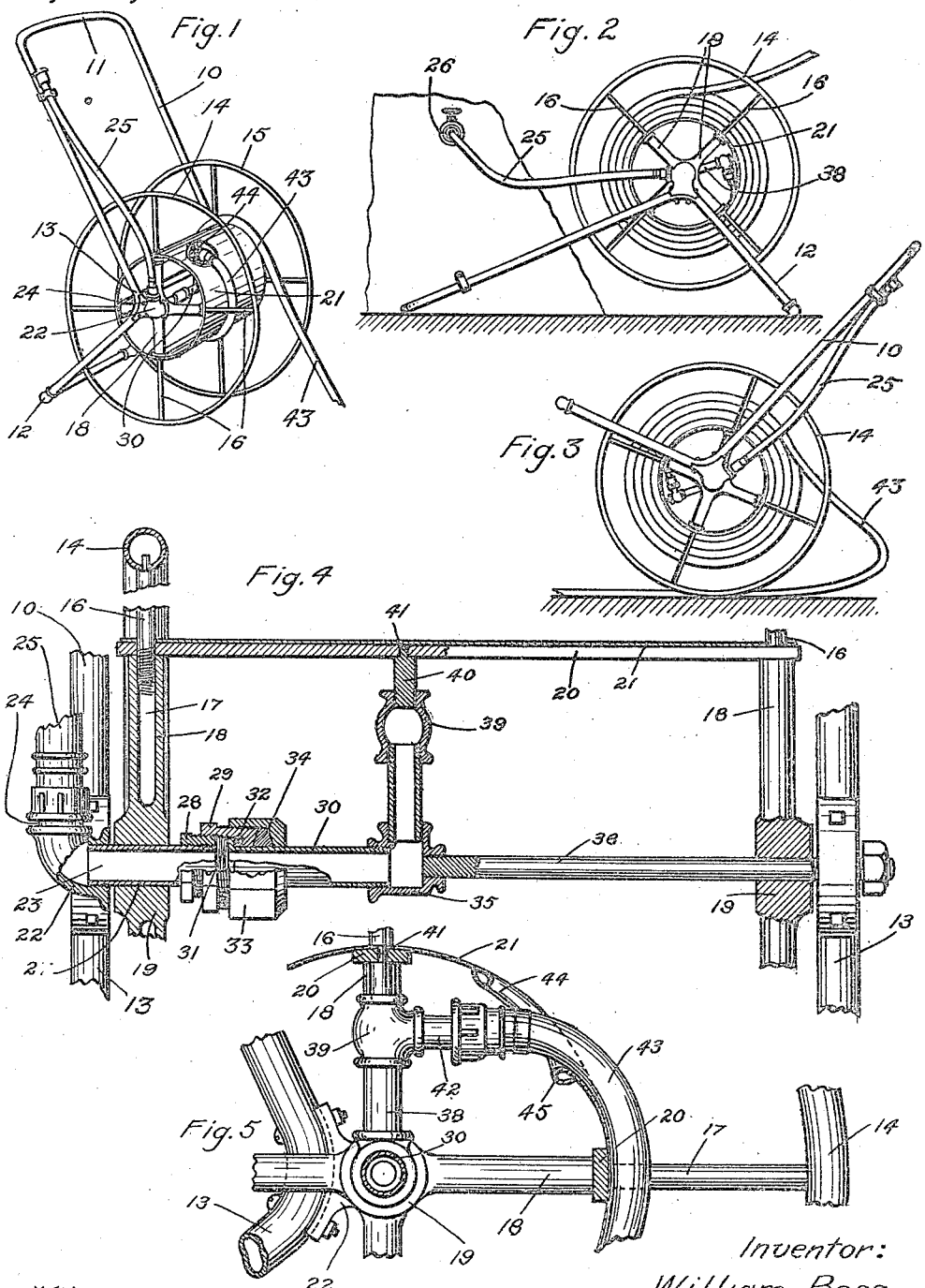

WILLIAM BOSS, OF ST. PAUL, MINNESOTA.

HOSE-REEL.

1,255,854.   Specification of Letters Patent.   Patented Feb. 12, 1918.

Application filed September 7, 1915. Serial No. 49,210.

*To all whom it may concern:*

Be it known that I, WILLIAM BOSS, a citizen of the United States, residing at St. Paul, in the county of Ramsey and State of Minnesota, have invented certain new and useful Improvements in Hose-Reels, of which the following is a specification.

My invention relates to hose reels and has for its object to provide a hose reel in which the reel itself shall be directly connected with wheels whereby the same may be moved over the ground and the hose unrolled or rolled up, together with means for providing a hydrant connection running to the center of the reel and adapted to operate for admitting water to the hose whether the hose is extended or wound upon the reel. My invention further includes novel features of construction in connection with the reel body and also in connection with the means of rotatably mounting the reel in reference to the hydrant connecting means.

The full objects and advantages of my invention will appear in connection with the detailed description thereof and are particularly pointed out in the claims.

In the drawings, illustrating the application of my invention in one form,—

Figure 1 shows the reel ready for rolling. Fig. 2 shows the reel with the hydrant connector attached and the hose partly unrolled. Fig. 3 shows the reel in position for winding up. Fig. 4 is a sectional detail view showing the manner of connecting the hydrant connector with the hose on the reel. Fig. 5 is a detail view showing additional construction features of the reel.

As illustrated, I provide a frame 10 which consists of two U-pieces 11 and 12 bent so as to form a broad angle at 13, the entire frame being preferably formed of metal tubing or pipe. The reel is journaled to the U-pieces at the bends 13 in a manner which will hereinafter be pointed out.

This reel comprises two wheels 14 and 15 preferably of tubing. Spokes 16 enter sockets 17 in radial extensions 18 of hubs 19 by which the wheels are supported. Extending across so as to rest upon the extensions 18 are crossbars 20 through the ends of which the spokes 16 extend, as clearly shown in Fig. 4. The crossbars 20 form a support for a cylindrical reel base 21 formed of sheet metal. Bolted to the frame member at one of the portions 13 is a casting 22 which has a tubular channel 23 therein making a right-angled bend at the point 13 where the casting is bolted to frame 10. To the outward portion 24 of said passageway which extends radially with respect to drum 21 is secured a short length of hose 25 adapted to be connected to the hydrant 26 as indicated in Fig. 2. The hub 19 of wheel 14 is journaled upon the inwardly-extended portion 27 of pipe 23 inside of frame member 10, as best shown in Fig. 4. The member 27 has secured thereto a double-threaded bushing 28 upon which is threaded a clamp nut 29. This nut surrounds a piece of piping 30 which has a flange 31. Within the nut 29 and between flange 31 and the collar of nut is packing material 32. A packing nut 33 also surrounds pipe 30 and is threaded upon nut 29, other packing material 34 filling the space around pipe 30 between the heads of nuts 29 and 33. Pipe 30 is rigidly threaded into a T 35 into the opposite end of which in alinement with pipe 30 is an axle extension 36 upon which the hub 19 of wheel 15 is journaled. Threaded into T 35 and extending radially with respect thereto and therefore at right angles to pipe 30 is a pipe section 38 which is threaded into a T 39. A bolt 40 extended from said T 39 has a shouldered end 41 extended through one of bars 20. A coupling extension 42 leads at right angles to pipe 38 from T 39 and to this is secured the hose 43, said hose passing through an oval hole 44 in metal drum 21. As shown in Fig. 5, the hole 44 is formed with a rounded edge by cutting the metal and turning the same inwardly, as indicated at 45.

The advantages of my invention are apparent. The reel comprising wheels 14 and 15 has an ample hose-receiving drum which is very simple and efficiently supported upon the wheels. The wheels at the same time form a string of side members for the coil of hose upon the reel and means of carrying the same over the ground. The frame member comprises at the same time a handle for pushing the hose reel over the ground, as indicated in Fig. 3, and a support for holding it in position to be rolled upon the frame as indicated in Fig. 2. The construction for connecting one portion of the hose directly to the hydrant while the other part is coiled upon the reel and free to revolve is simple and effective, permitting ready revolution of the reel and at the same time a water-tight joint by reason of the packing nut 34 and for the additional reason that the pressure of the water in pipe 30 will tend to force shoulder 31 against packing 32. This reel is particularly desirable in connection with large lawns or public grounds where very large reaches of hose are employed. The transporting of the hose to and from the storage room is a matter of no difficulty, and the hose may be laid upon the ground for long reaches by simply rolling the reel along the ground.

I claim:

1. A hose reel comprising a frame bent so as to form either a base or a handle for propelling the reel, a fixed pipe section, a movable pipe section and a rod extending in a line through and supported upon said frame, a pair of wheels supporting a drum carried by said rod and pipe section, the movable pipe being secured to said drum and held positioned thereby, said fixed pipe section providing a journal support for one of said wheels, and a water-tight connection between the movable pipe section and the fixed pipe section located between the two wheels.

2. A hose reel comprising a frame, a pair of wheels journaled to the frame said wheels including hubs with radial extensions, crossbars on the extensions, spokes extending through the crossbars and into the extensions, a drum mounted on the crossbars, a pipe connection extending through one of said journals and having a water-tight rotatable joint therein, a pipe connected with and extending at right angles thereto and supported at its end from one of said crossbars, and a hose coupling extension from said last-named pipe.

3. A hose reel comprising a frame, a pair of wheels journaled to the frame said wheels including hubs with radial extensions, crossbars on the extensions, spokes extending through the crossbars and into the extensions, a drum mounted on the crossbars, a pipe connection extending through one of said journals and having a water-tight rotatable joint therein, a pipe connected with and extending at right angles thereto and supported at its end from one of said crossbars, and a hose coupling extension from said last-named pipe, said drum being provided with an aperture formed with rounded edge for admitting the hose for connection with said coupling member.

In testimony whereof I affix my signature in presence of two witnesses.

WILLIAM BOSS.

Witnesses:
F. A. WHITELEY,
H. A. BOWMAN.